US012677144B2

(12) United States Patent
Mildh et al.

(10) Patent No.: US 12,677,144 B2
(45) Date of Patent: *Jul. 7, 2026

(54) SECURITY VERIFICATION WHEN RESUMING AN RRC CONNECTION

(71) Applicant: Telefonaktiebolaget LM Ericsson (publ), Stockholm (SE)

(72) Inventors: Gunnar Mildh, Sollentuna (SE); Icaro L. J. Da Silva, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 396 days.

This patent is subject to a terminal disclaimer.

(21) Appl. No.: 18/538,620

(22) Filed: Dec. 13, 2023

(65) Prior Publication Data

US 2024/0114334 A1     Apr. 4, 2024

Related U.S. Application Data

(63) Continuation of application No. 17/844,443, filed on Jun. 20, 2022, now Pat. No. 11,889,301, which is a
(Continued)

(51) Int. Cl.
H04W 12/03 (2021.01)
H04W 12/037 (2021.01)
(Continued)

(52) U.S. Cl.
CPC ....... H04W 12/037 (2021.01); H04W 12/106 (2021.01); H04W 76/19 (2018.02);
(Continued)

(58) Field of Classification Search
CPC . H04W 12/037; H04W 12/106; H04W 76/19; H04W 76/27; H04W 76/28; H04W 76/38; H04W 80/08
(Continued)

(56) References Cited

U.S. PATENT DOCUMENTS

2011/0269426 A1     11/2011   Hultin et al.
2012/0142361 A1      6/2012   Zhao et al.
(Continued)

FOREIGN PATENT DOCUMENTS

CA          2823789 C      8/2016
CN        103858512 A      6/2014
(Continued)

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.5.1, Jan. 2018, 1-764.
(Continued)

*Primary Examiner* — Joel Ajayi

(74) *Attorney, Agent, or Firm* — Murphy, Bilak & Homiller, PLLC

(57) ABSTRACT

According to an aspect, a wireless device sends, while in an RRC inactive state, a message requesting resumption of an RRC connected state. Upon sending the message, the wireless device starts a timer according to a predetermined value. While the timer is running, the wireless device attempts decryption and integrity check handling for packets subsequently received from the wireless network.

19 Claims, 12 Drawing Sheets

Related U.S. Application Data continuation of application No. 17/066,022, filed on Oct. 8, 2020, now Pat. No. 11,399,278, which is a continuation of application No. 16/346,895, filed as application No. PCT/SE2019/050271 on Mar. 26, 2019, now Pat. No. 10,834,581.

(60) Provisional application No. 62/648,116, filed on Mar. 26, 2018.

(51) Int. Cl.

| | |
|---|---|
| *H04W 12/106* | (2021.01) |
| *H04W 76/19* | (2018.01) |
| *H04W 76/27* | (2018.01) |
| *H04W 76/28* | (2018.01) |
| *H04W 76/38* | (2018.01) |
| *H04W 80/08* | (2009.01) |

(52) U.S. Cl.
CPC ........... *H04W 76/27* (2018.02); *H04W 76/28* (2018.02); *H04W 76/38* (2018.02); *H04W 80/08* (2013.01)

(58) Field of Classification Search
USPC .......................................................... 455/411
See application file for complete search history.

(56) References Cited

U.S. PATENT DOCUMENTS

| | | |
|---|---|---|
| 2012/0257510 A1 | 10/2012 | Jeong et al. |
| 2015/0079971 A1 | 3/2015 | Goldhofer et al. |
| 2018/0227809 A1 | 8/2018 | Nair |
| 2018/0234839 A1 | 8/2018 | Tenny et al. |
| 2018/0234941 A1* | 8/2018 | Kim ...................... H04W 76/19 |
| 2018/0270792 A1 | 9/2018 | Park et al. |
| 2018/0279188 A1 | 9/2018 | Tenny et al. |
| 2018/0279204 A1 | 9/2018 | Kim et al. |

FOREIGN PATENT DOCUMENTS

| | | |
|---|---|---|
| WO | 2017027798 A1 | 2/2017 |
| WO | 2017048170 A1 | 3/2017 |
| WO | 2017085621 A1 | 5/2017 |

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 15)", TS 36.331 V15.0.0, Dec. 2017, 1-776.

3GPP, "3rd Generation Partnership Project; Technical Specification Group Services and System Aspects; 3GPP System Architecture Evolution (SAE); Security architecture (Release 15)", 3GPP TS 33.401 V15.0.0, Jun. 2017, 1-153.

3GPP, "3rd Generation Partnership Project; Technical Specification Group Services and System Aspects; Security architecture and procedures for 5G system (Release 15)", 3GPP TS 33.501 V15.3.1, Dec. 2018, 1-181.

Unknown, Author , "CR on Connection Control ([101#37][NR] RRC procedures/messages)", 3GPP TSG-RAN WG2 #101Bis Tdoc R2-180xxxx (R2-1805355) Sanya, P.R. of China, Apr. 16-20, 2018, 1-304.

Unknown, Author , "New RRC message without integrity protection in Rel-9", Ericsson, 3GPP TSG SA WG3 Security—SA3#60 S3-100772, Montreal, Canada, Jun. 28-Jul. 2, 2010, 1-2.

Unknown, Author , "Report of Email Discussion [NR-AH1801#14][NR] RRC inactive procedures", 3GPP TSG-RAN WG2 Meeting #101 R2-1803778, Athens, Greece, Feb. 26-Mar. 2, 2018, 1-16.

Unknown, Author , "Timer for RRC Resume Request (T300X)", 3GPP TSG-RAN WG2 #102 Tdoc R2-1807921, Busan, Korea, May 21-25, 2018, 1-2.

Unknown, Author , "Transitioning to Idle from Inactive upon resume failure", 3GPP TSG-RAN WG2 Meeting #101bis R2-1805107, Sanya, China, Apr. 16-Apr. 20, 2018, 1-2.

* cited by examiner

300

RECEIVE, FROM A WIRELESS DEVICE OPERATING IN AN RRC INACTIVE STATE, A MESSAGE REQUESTING RESUMPTION OF AN RRC CONNECTED STATE FOR THE WIRELESS DEVICE
302

IN RESPONSE TO THE MESSAGE, ENCRYPT AND INTEGRITY PROTECT ONE OR MORE RESPONSE MESSAGES
304

SEND THE ENCRYPTED AND INTEGRITY PROTECTED ONE OR MORE RESPONSE MESSAGES TO THE WIRELESS DEVICE
306

500

SEND, WHILE IN AN RRC INACTIVE STATE, A MESSAGE
REQUESTING RESUMPTION OF AN RRC CONNECTED STATE
502

UPON SENDING THE MESSAGE, START A TIMER ACCORDING
TO A PREDETERMINED VALUE
504

WHILE THE TIMER IS RUNNING, ATTEMPT DECRYPTION AND
INTEGRITY CHECK HANDLING FOR PACKETS SUBSEQUENTLY
RECEIVED FROM THE WIRELESS NETWORK
506

30

32, 44, 46

ANTENNA(S) 34

TRANSCEIVER CIRCUITRY 36

COMMUNICATION INTERFACE
CIRCUITRY
38

RECEIVING MODULE
1302

ENCRPYTING AND INTEGRITY
PROTECTING MODULE
1304

SENDING MODULE
1306

SECURITY VERIFICATION WHEN RESUMING AN RRC CONNECTION

TECHNICAL FIELD

The present application is generally related to wireless communication networks and is more particularly related to techniques for providing security of messages and RRC connections.

BACKGROUND

In Long Term Evolution (LTE) Release 13, a mechanism was introduced for the user equipment (UE) to be suspended by the network in a state similar to RRC_IDLE, but with the difference being that the UE stores the Access Stratum (AS) context or Radio Resource Control (RRC) context. This makes it possible to reduce the signaling when the UE is becoming active again, by resuming the RRC connection instead of establishing the RRC connection from scratch. Reducing the signaling could have several benefits, including reduced latency for UEs accessing the Internet and reduced battery consumption for machine-type devices that send very little data. The LTE Release 13 solution is based on the UE sending an RRCConnectionResumeRequest message to the network and, in response, receiving an RRCConnectionResume from the network. The RRCConnectionResume is not encrypted but it is integrity protected.

The $3^{rd}$-Generation Partnership Project (3GPP) is developing specifications for the $5^{th}$-generation wireless communications technology commonly referred to as 5G. In the new system and architecture standard for 5G, various state machines are introduced to make sure that a UE is reachable.

The signaling connection over N1 is used to enable Non-Access-Stratum (NAS) signaling exchange between the UE and the core network. It comprises both the AN (Access Node) signaling connection between the UE and the AN and the N2 connection, between the AN and the Access and Mobility Function (AMF). A UE can be in RRC_CONNECTED, RRC_INACTIVE or RRC_IDLE states. A UE is either in RRC_CONNECTED state or in RRC_INACTIVE state when an RRC connection has been established. If this is not the case (i.e., no RRC connection is established), the UE is in RRC_IDLE state.

In RRC_IDLE, the UE is configured to listen to a paging channel at certain occasions, perform cell (re)selection procedures and listen to system information. In RRC_INACTIVE, the UE is also listening to a paging channel and does cell (re)selection procedures, but in addition, it also maintains a configuration. The configuration is also kept on the network side, such that, when needed, e.g., when data arrives to the UE, it does not require a complete setup procedure to start transmitting data. In RRC_CONNECTED, there is transfer of data to or from the UE and the network controls the mobility. This means that the network controls when the UE should handover to other cells. In RRC_CONNECTED, the UE still monitors the paging channel and it monitors control channels that are associated with whether there is data for the UE or not. It provides channel quality and feedback information to the network, performs neighboring cell measurements and reports these measurements to the network.

As part of the standardized work on 5G NR in 3GPP, it has been decided that New Radio (NR) should support RRC_INACTIVE state with some properties that are similar to those of the suspended state in LTE Release 13. The RRC_INACTIVE state has slightly different properties from the suspended state in LTE Release 13, in that it is a separate RRC state and not part of RRC_IDLE state as in LTE. Additionally, the core network (CN)/radio access network (RAN) connection (NG or N2 interface) is kept for RRC_INACTIVE state, while it was suspended in LTE. FIG. 1 illustrates a UE state machine and state transitions in NR. The properties of the states above are as follows. For RRC_IDLE state: a UE-specific discontinuous reception (DRX) may be configured by upper layers; UE controlled mobility may be based on network configuration; the UE monitors a paging channel for CN paging using 5G-S-TMSI; the UE performs neighboring cell measurements and cell (re)selection; and the UE acquires system information.

For RRC_INACTIVE state: a UE specific DRX may be configured by upper layers or by an RRC layer; UE controlled mobility may be based on network configuration; the UE stores the AS context; the UE monitors a paging channel for CN paging using an 5G-S-TMSI (Temporary Mobile Subscriber Identity) and RAN paging using an I-RNTI (Radio Network Temporary Identifier); the UE performs neighboring cell measurements and cell (re)selection; the UE performs RAN-based notification area updates periodically and when moving outside the RAN-based notification area; and the UE acquires system information.

For RRC_CONNECTED state: the UE stores the AS context; there is a transfer of unicast data to/from UE; and at lower layers, the UE may be configured with a UE specific DRX. For UEs supporting carrier aggregation (CA), one or more Secondary Cells (SCells), aggregated with the Special Cell (SpCell), are used for increased bandwidth. For UEs supporting dual connectivity (DC), the secondary cell group (SCG), aggregated with the master cell group (MCG), is used for increased bandwidth. There is network controlled mobility, i.e., handover within NR and to/from E-UTRAN. The UE monitors a paging channel, monitors control channels associated with the shared data channel to determine if data is scheduled for it, and provides channel quality and feedback information. The UE also performs neighboring cell measurements and measurement reporting and acquires system information.

In prior mechanisms, the UE verifies messages from the network prior to the start of encryption. In LTE, there are some messages sent from the network to the UE that are used to start or resume the encryption of RRC signaling: SecurityMode Command message, possibly sent as part of RRC connection establishment; and RRCConnectionResume message, sent as part of RRC connection resume. These messages are integrity protected, but not encrypted. The 3GPP LTE RRC specification TS 36.331 v15.0.0 specifies how the UE on the RRC level verifies the integrity of these messages. In all of these cases, the UE RRC, upon reception of the message, asks lower layers (e.g., Packet Data Convergence Protocol, or PDCP) to verify the integrity of the message. If the message is verified, the UE RRC layer configures the lower layers to apply ciphering and integrity production of all subsequent messages. For example, upon receiving the SecurityMode Command, the UE shall request lower layers to verify the integrity protection of the SecurityModeCommand message, using the algorithm indicated by the integrityProtAlgorithm as included in the SecurityModeCommand message and the $KRRC_{int}$ key. If the SecurityModeCommand message passes the integrity protection check, the lower layers are configured to apply integrity protection using the indicated algorithm and the $KRRC_{int}$ key immediately to all subsequent messages. The lower layers are also configured to apply ciphering to subsequent messages using the indicated algorithm, the $KRRC_{enc}$ key and the $KUP_{enc}$ key after completing the procedure. Upon receiving the RRCConnectionResume, the UE shall stop the appropriate timers, request lower layers to verify the integrity protection of the RRCConnectionResume message and resume integrity protection and deciphering, using the previously configured algorithm, ciphering configuration and the $KRRC_{int}$ key.

Once the UE has started integrity protection and encryption, the UE will trigger an RRC connection re-establishment procedure if the lower layer reports that a packet related to a signaling radio bearer has failed integrity protection verification. For example, as specified in 3GPP TS 36.331 v15.0.0, the UE shall only initiate the RRC connection re-establishment procedure when AS security has been activated or for a Narrowband Internet-of-Things (NB-IoT) UE supporting RRC connection re-establishment for the Control Plane CIoT Evolved Packet System (EPS) optimization. The UE initiates the RRC connection re-establishment procedure when one of several conditions has been met or detected: radio link failure; handover failure; mobility from E-UTRA failure; integrity check failure indicated from lower layers concerning SRB1 or SRB2; or an RRC connection reconfiguration failure.

SUMMARY

It is desirable that the RRCResume message sent from the network to the UE be encrypted, since this makes it possible to assign the UE with parameters that can be secret and not exposed to other listeners. Embodiments of the present invention introduce a mechanism in the UE for handling security verification of the RRCResume/RRCConnectionResume during an RRC resume procedure. This solution allows for the encryption of the MSG4 (RRCResume/RRCConnectionResume/RRCSuspend/RRCRelease, etc.). The solution is associated with a timer at the beginning of the RRC resume procedure (e.g., when the UE sends an RRCResumeRequest message). This timer is stopped when the UE receives a valid (verified) response message, such as an RRCResume/RRCConnectionResume message (or any other response message that is expected by the UE in response to an RRCResumeRequest such as RRCReject, RRCRelease or RRCSuspend). If the timer expires, the RRC layer will inform the upper layer that the UE failed to resume the RRC connection. Additionally, the RRC layer could discard the stored UE AS context (or other RRC related information). The PDCP layer (or other lower layer) in the UE will, during the resume procedure, perform both decryption and integrity verification of PDCP PDUs received from the network. If the PDCP receives a PDU that fails the integrity verification, it will discard the packet.

According to some embodiments, a method, in a wireless device operating in a wireless network, for providing security of messages, includes sending, while in an RRC inactive state, a message requesting resumption of an RRC connected state. The method also includes, upon sending the message, starting a timer according to a predetermined value. The method further includes, while the timer is running, attempting decryption and integrity check handling for packets subsequently received from the wireless network.

According to some embodiments, a wireless device configured for operating in a wireless network and for providing security of messages includes transceiver circuitry and processing circuitry operatively associated with the transceiver circuitry. The processing circuitry is configured to send, while in an RRC inactive state, a message requesting resumption of an RRC connected state. The processing circuitry is configured to, upon sending the message, start a timer according to a predetermined value and, while the timer is running, attempt decryption and integrity check handling for packets subsequently received from the wireless network.

According to some embodiments, a method, in one or more nodes in or connected to a wireless network, for providing security of messages, includes receiving, from a wireless device operating in an RRC inactive state, a message requesting resumption of an RRC connected state for the wireless device. The method also includes, in response to the message, encrypting and integrity protecting one or more response messages. The method further includes sending the encrypted and integrity protected one or more response messages to the wireless device.

According to some embodiments, one or more network nodes in or connected to a wireless network, configured for providing security of messages, includes communication circuitry and processing circuitry operatively associated with the communication circuitry. The processing circuitry is configured to receive, from a wireless device operating in an RRC inactive state, a message requesting resumption of an RRC connected state for the wireless device and, in response to said message, encrypt and integrity protect one or more response messages. The processing circuitry is also configured to send the encrypted and integrity protected one or more response messages to the wireless device.

Further aspects of the present invention are directed to an apparatus, a wireless device, one or more nodes, computer program products or computer readable storage medium corresponding to the methods summarized above and functional implementations of the above-summarized apparatus and wireless device.

Embodiments of the present invention are applicable to both LTE and NR as well as other future technologies. The embodiments makes it possible to encrypt the RRCResume/RRCConnectionResume or any other message transmitted in response to an RRCConnectionRequest. This increases security and privacy while speeding up the RRC connection resumption, since no additional encrypted message is needed.

Of course, the present invention is not limited to the above features and advantages. Those of ordinary skill in the art will recognize additional features and advantages upon reading the following detailed description, and upon viewing the accompanying drawings.

DETAILED DESCRIPTION

Figure 1:
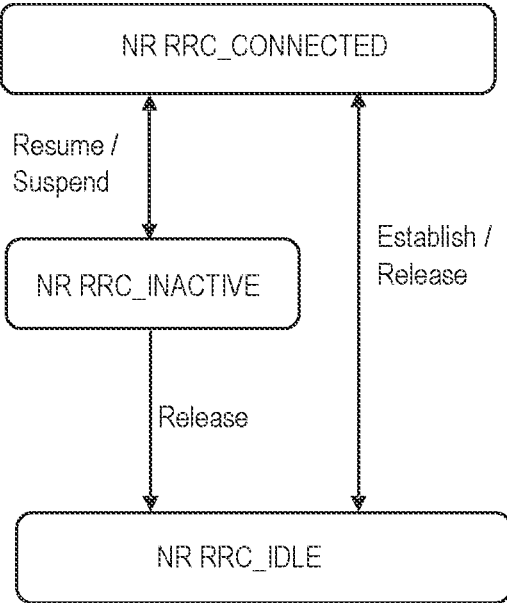
FIG. 1 illustrates a UE state machine and state transitions in NR.

The presently disclosed techniques are described in the context of 5GS wireless communications standards. It will be appreciated, however, that the techniques may be generally applicable to other wireless communications networks, such as a Long Term Evolution (LTE) network. For the purpose of understanding the scope of the presently disclosed techniques and apparatuses, a wireless device may be a UE. However, these terms should be understood more generally, as referring to wireless devices configured to operate as access terminals in a wireless communication network, whether those wireless devices are consumer-oriented devices such as cellular telephones, smartphones, wireless-equipped laptops, tablets, or the like, or machine-to-machine (M2M) devices for use in industrial applications or in enabling the Internet of Things (IoT). Likewise, the term gNB should be understood to refer generally to base stations or access network nodes in a wireless communications system.

It is desirable that the RRCResume message sent from the network to the UE be encrypted, since this makes it possible to assign the UE with parameters that can be secret and not exposed to other listeners. These parameters could be related to the UE capabilities, which could in turn be sensitive for end user privacy, or the parameters could be related to the security of the connection, which could, if exposed, be used by somebody hacking the connection or committing fraud.

In LTE Release 13, the corresponding RRCConnection-Resume message was not encrypted, but only integrity protected. For this reason, the specification limited what type of information can be contained in this message. If the network wants to send to the UE some sensitive information, it needs to send this to the UE in a separate encrypted message (an RRCConnectionReconfiguration message sent after the RRCConnectionResume) that would add delay and overhead.

For the 5G NR standard, the MSG4 corresponding to the RRCResume/RRCConnectionResume should, if possible, be encrypted. For example, in the case where the RAN is successful in retrieving and verifying the UE context, MSG4 should be integrity protected, ciphered and sent on SRB1. Differently from LTE, this would require that encryption is started prior to the UE verifying the RRCResume/RRCConnectionResume, which is different from the previous approach where encryption is started after verification.

If the RRCResume/RRCConnectionResume message (or any equivalent message received by the UE to resume an RRC connection) is encrypted, it is no longer possible for the UE to verify the security of that message on RRC level (as was done previously). The reason for this is if the real network (e.g., due to error) or a fake/malicious base station is not using the same key as the UE for integrity protection or encryption, the message will be garbled (it will look like garbage and might not be detectable) during the decrypted process. As a result, the RRC level in the UE will not be able to determine which message the network has sent, i.e., it will not know whether it is RRCResume/RRCConnectionResume or if it is some other message, such as a RRCRelease or RRCSuspend. The UE will thus not be able to order lower layers to verify the message.

Embodiments of the present invention introduce a mechanism in the UE for handling security verification of the RRCResume/RRCConnectionResume during RRC resume procedure. This solution avoids the problem described above and allows for the encryption of the MSG4 (RRCResume/RRCConnectionResume/RRCSuspend/RRCRelease, etc.). The solution is associated with the UE starting a timer at the beginning of the RRC resume procedure (e.g., when the UE sends an RRCResumeRequest message). This timer is stopped when the UE receives a valid (verified) response message such as an RRCResume/RRCConnectionResume message (or any other response message that is expected by the UE in response to an RRCResumeRequest such as RRCReject, RRCRelease or RRCSuspend). If the timer expires (times out), the RRC layer will inform upper layer (e.g., NAS) that the UE failed to resume the RRC connection. Additionally, the RRC layer could discard the stored UE AS context (or other RRC related information).

The PDCP layer (or other lower layer) in the UE will, during the resume procedure (starting from after the UE sent the resume request message), perform both decryption and integrity verification of PDCP PDUs received from the network. If the PDCP receives a PDU that fails the integrity verification, it will discard the packet. Additionally, it may, in some embodiments, inform the RRC layer that it has received a message (or PDU) failing integrity verification.

In the case where the PDCP layer sends the indication to the RRC layer, the RRC layer can inform the upper layer (e.g., NAS) immediately that the UE failed to resume the RRC connection. Additionally, the RRC layer could discard the stored UE AS context (or other RRC related information). In the case where the PDCP layer does not send the indication to the RRC layer, the timer will eventually time out leading to the same UE behavior as above.

Embodiments of the present invention provide a mechanism in the UE for verifying the security of the RRCResume message, even after encryption and integrity verification has started. The mechanism may be based on the UE starting integrity protection and encryption prior to receiving the message (e.g., after sending the RRCResumeRequest message) and the lower layers may be instructed to discard any packets failing verification, and, optionally, inform a higher layer about integrity verification failures. In particular, in some embodiments, the method in the RRC specifications also avoids the UE having to perform certain actions upon the reception of RRCResume (or any other response message such as RRCReject, RRCSuspend or RRCRelease) before verifying the UE.

Figure 2:
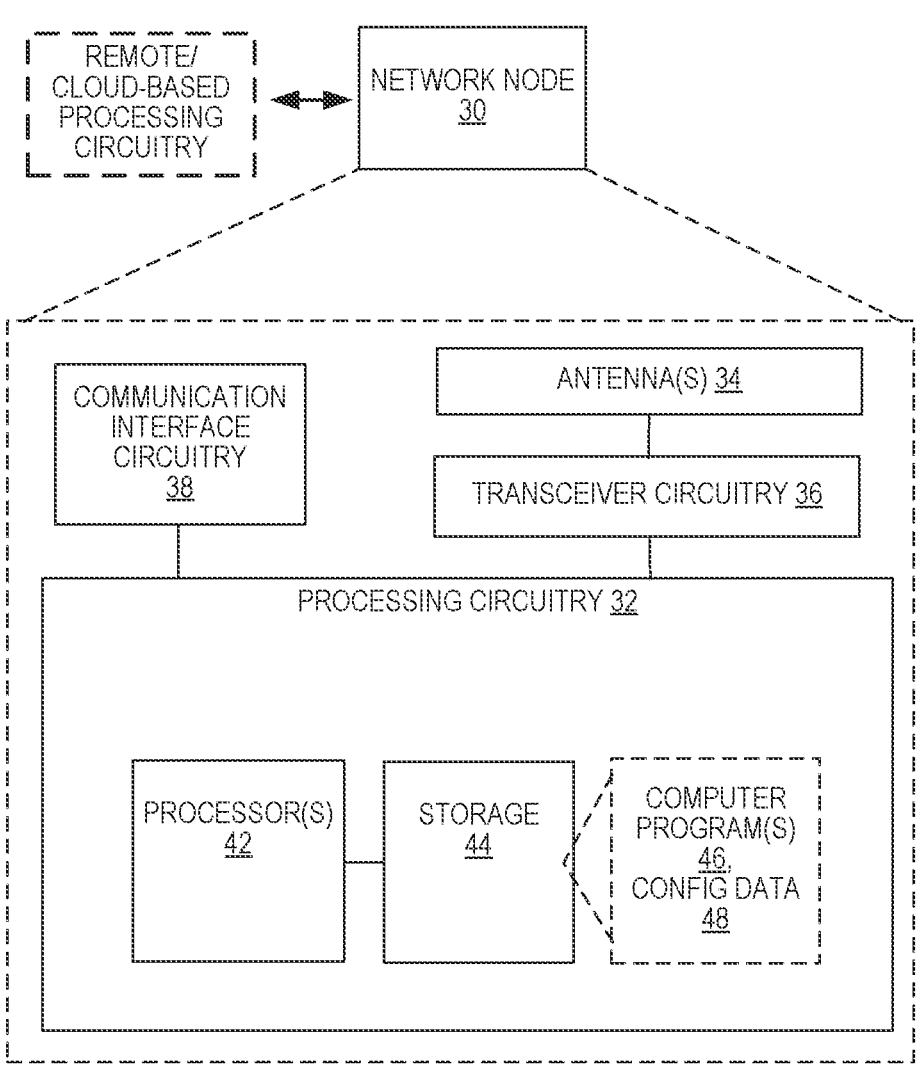
FIG. 2 is a block diagram illustrating an example network node, according to some embodiments.

Accordingly, FIG. 2 is a block diagram illustrating an example network node 30, which may be configured to operate as a base station. The network node 30 may be one of multiple network nodes in a cloud-based system that carry out the described techniques. The network node 30 may be, for example, an eNB or a 5G gNB. The network node 30 provides an air interface to a wireless device, e.g., 5G air interface for downlink transmission and uplink reception, which is implemented via antennas 34 and transceiver circuitry 36. The transceiver circuitry 36 includes transmitter circuits, receiver circuits, and associated control circuits that are collectively configured to transmit and receive signals according to a radio access technology, for the purposes of providing cellular communication, or WLAN services if necessary. According to various embodiments, cellular communication services may be operated according to any one or more of the 3GPP cellular standards, GSM, GPRS, WCDMA, HSDPA, LTE, LTE-Advanced and 5G. The network node 30 also include communication interface circuitry 38 for communicating with nodes in the core network, other peer radio nodes, and/or other types of nodes in the network.

The network node 30 also includes one or more processing circuits 32 that are operatively associated with and configured to control the communication interface circuitry 38 and/or the transceiver circuitry 36. The processing circuitry 32 comprises one or more digital processors 42, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any combination thereof. More generally, the processing circuitry 32 may comprise fixed circuitry, or programmable circuitry that is specially configured via the execution of program instructions implementing the functionality taught herein, or may comprise some combination of fixed and programmable circuitry. The processor(s) 42 may be multi-core.

The processing circuitry 32 also includes a memory 44. The memory 44, in some embodiments, stores one or more computer programs 46 and, optionally, configuration data 48. The memory 44 provides non-transitory storage for the computer program 46 and it may comprise one or more types of computer-readable media, such as disk storage, solid-state memory storage, or any combination thereof. By way of non-limiting example, the memory 44 may comprise any one or more of SRAM, DRAM, EEPROM, and FLASH memory, which may be in the processing circuitry 32 and/or separate from the processing circuitry 32. In general, the memory 44 comprises one or more types of computer-readable storage media providing non-transitory storage of the computer program 46 and any configuration data 48 used by the network node 30. Here, "non-transitory" means permanent, semi-permanent, or at least temporarily persistent storage and encompasses both long-term storage in non-volatile memory and storage in working memory, e.g., for program execution.

In some embodiments, the processing circuitry 32 of one or more network nodes 30 connected to a wireless network is configured to perform operations for providing security of messages. The processing circuitry 32 is configured to receive, from a wireless device operating in an RRC inactive state, a message requesting resumption of an RRC connected state for the wireless device. The processing circuitry 32 is also configured to, in response to the message, encrypt and integrity protect one or more response messages and send the encrypted and integrity protected one or more response messages to the wireless device.

Figure 3:
FIG. 3 is a process flow diagram illustrating an example method according to some embodiments, as carried out in one or more nodes, such as the network node of FIG. 2.
Figure 3:
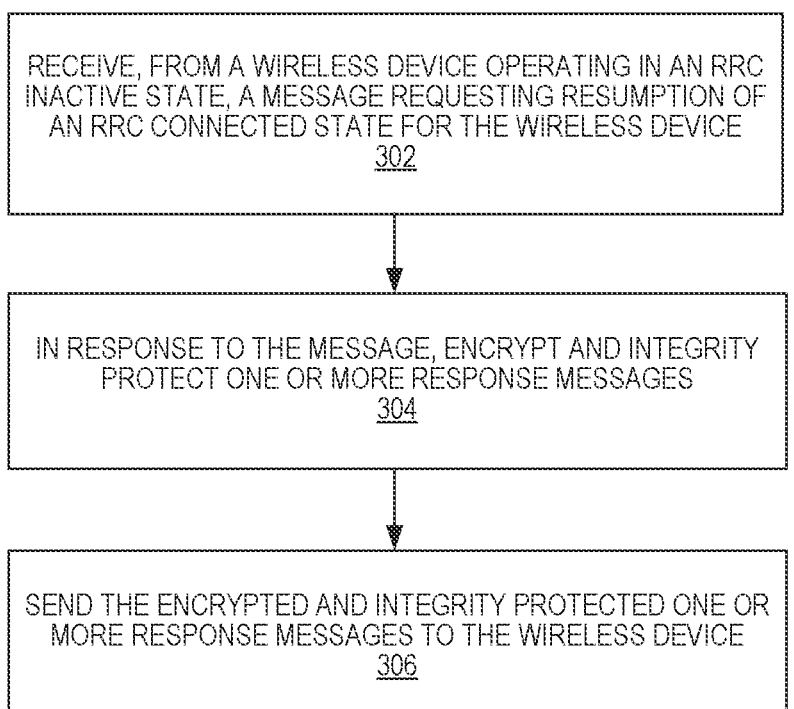

The processing circuitry 32 is also configured to perform a corresponding method 300, as shown in FIG. 3. The method 300 includes receiving, from a wireless device operating in an RRC inactive state, a message requesting resumption of an RRC connected state for the wireless device (block 302). The method 300 includes, in response to the message, encrypting and integrity protecting one or more response messages (block 304) and sending the encrypted and integrity protected one or more response messages to the wireless device (block 306).

The method 300 may further include starting a timer with a predetermined value, in response to receiving the message requesting resumption of the RRC connected state for the wireless device, and responsive to the timer expiring without the receipt of a message from the wireless device verifying resumption of the RRC connected state, removing the RRC connection.

Figure 4:
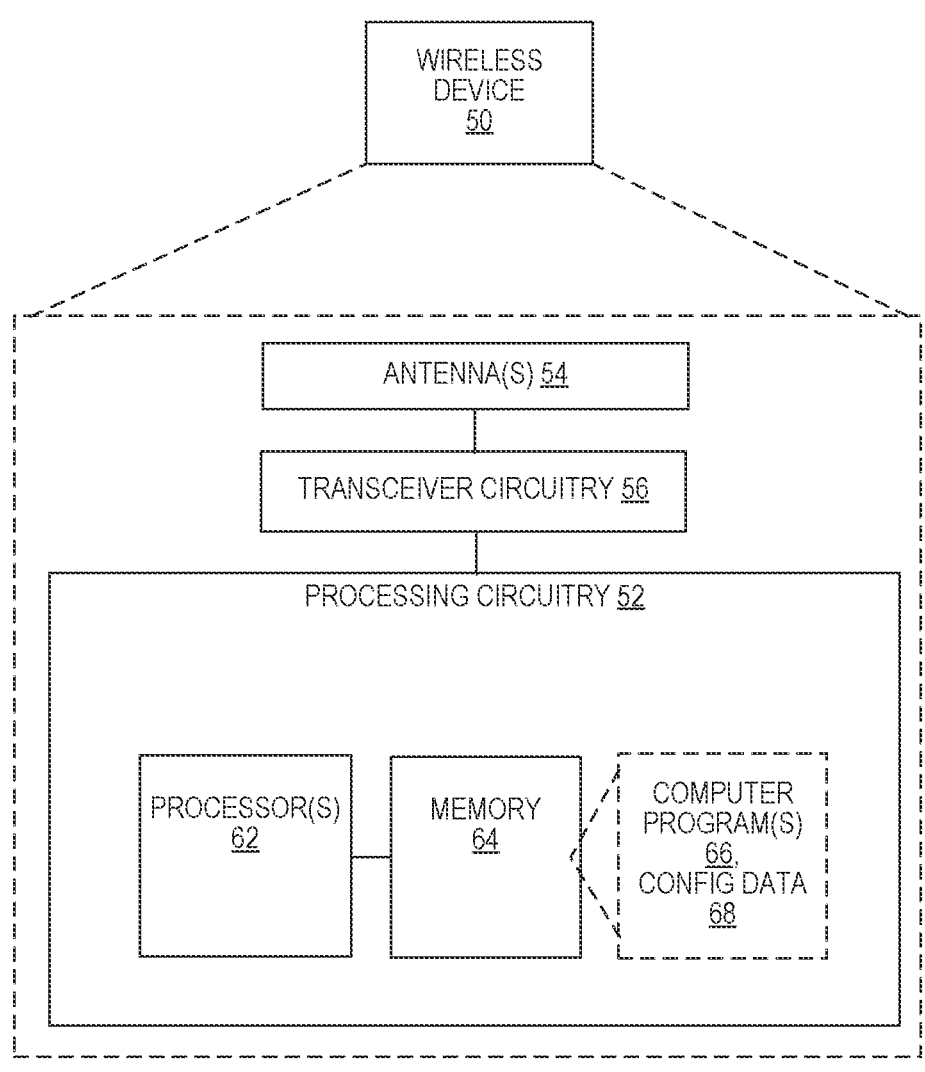
FIG. 4 is a block diagram illustrating an example wireless device, according to some embodiments.

FIG. 4 illustrates an example of the corresponding wireless device 50 that is configured to perform the techniques described herein for the wireless device for providing security of messages. The wireless device 50 may also be referred to, in various contexts, as a radio communication device, a UE, a target device, a device-to-device (D2D) UE, a machine-type UE or UE capable of machine to machine (M2M) communication, a sensor-equipped UE, a PDA (personal digital assistant), a wireless tablet, a mobile terminal, a smart phone, laptop-embedded equipment (LEE), laptop-mounted equipment (LME), a wireless USB dongle, a Customer Premises Equipment (CPE), etc.

The wireless device 50 communicates with one or more radio nodes or base stations, such as one or more network nodes 30, via antennas 54 and a transceiver circuitry 56. The transceiver circuitry 56 may include transmitter circuits, receiver circuits, and associated control circuits that are collectively configured to transmit and receive signals according to a radio access technology, for the purposes of providing cellular communication services.

The wireless device 50 also includes one or more processing circuits 52 that are operatively associated with and control the radio transceiver circuitry 56. The processing circuitry 52 comprises one or more digital processing circuits, e.g., one or more microprocessors, microcontrollers, DSPs, FPGAs, CPLDs, ASICs, or any mix thereof. More generally, the processing circuitry 52 may comprise fixed circuitry, or programmable circuitry that is specially adapted via the execution of program instructions implementing the functionality taught herein, or may comprise some mix of fixed and programmed circuitry. The processing circuitry 52 may be multi-core.

The processing circuitry 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. By way of non-limiting example, the memory 64 comprises any one or more of SRAM, DRAM, EEPROM, and FLASH memory, which may be in the processing circuitry 52 and/or separate from processing circuitry 52. In general, the memory 64 comprises one or more types of computer-readable storage media providing non-transitory storage of the computer program 66 and any configuration data 68 used by the wireless device 50.

Figure 5:
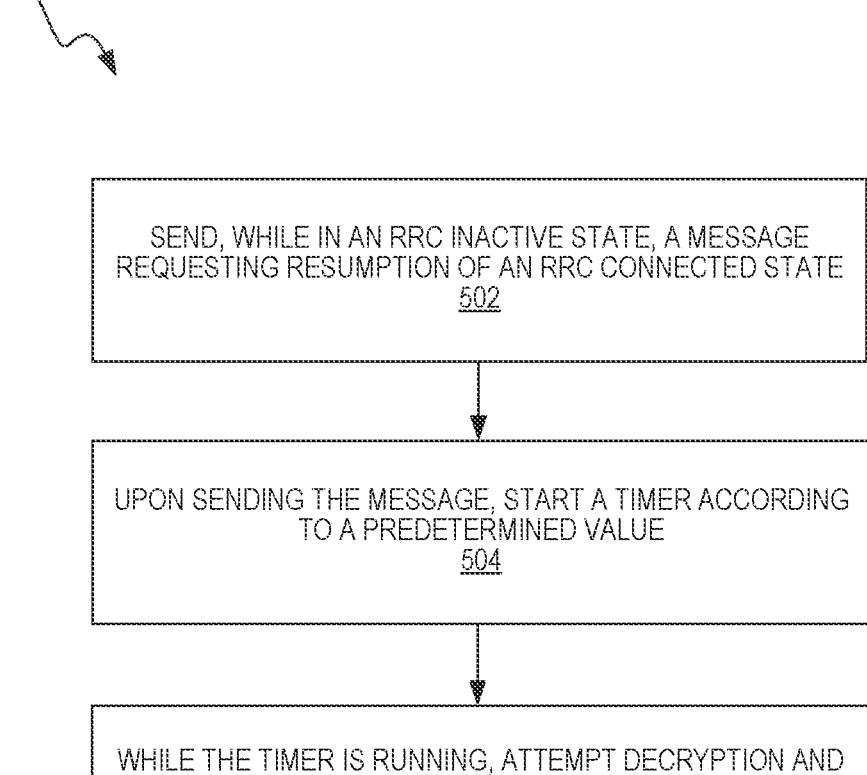
FIG. 5 is a process flow diagram illustrating an example method according to some embodiments, as carried out in the wireless device.

Accordingly, in some embodiments, the processing circuitry 52 of the wireless device 50 is configured to operate in a wireless network and provide security of messages. The processing circuitry 52 is configured to send, while in an RRC inactive state, a message requesting resumption of an RRC connected state. The processing circuitry 52 is configured to, upon sending the message, start a timer according to a predetermined value, and while the timer is running, attempt decryption and integrity check handling for packets subsequently received from the wireless network FIG. 5 is a process flow diagram illustrating a corresponding method 500 implemented in the wireless device 50 for providing security of messages. The method 500 includes sending, while in an RRC inactive state, a message requesting resumption of an RRC connected state (block 502). The method 500 also includes, upon sending the message, starting a timer according to a predetermined value (block 504). The method 500 further includes, while the timer is running, attempting decryption and integrity check handling for packets subsequently received from the wireless network (block 506).

In some embodiments, attempting decryption and integrity check handling may include a RRC layer requesting decryption and integrity check handling from a PDCP layer. The method 500 may further include, while the timer is running, determining that decryption or integrity checking has failed for a packet and discarding the packet for which decryption or integrity checking has failed. The determining may be performed in a first protocol layer and the method further comprises the first protocol layer notifying a higher protocol layer of the failure.

The method 500 may include, while the timer is running, successfully decrypting and integrity checking a message indicating a resumption of the RRC connected state, and responsive to said successfully decrypting and integrity checking a message, stopping the timer and entering the RRC connected state. The method 500 may further include subsequently to entering the RRC connected state, determining that a packet received while in the RRC connected state has failed integrity checking, and responsive to the failed integrity checking, initiating a re-establishment of the RRC connected state.

The method 500 may include determining that the timer has expired and, in response to the timer expiring, discarding stored information regarding the RRC connection. Determining that the timer has expired and discarding the stored information may be performed in a first protocol layer and the method 500 may further include the first protocol layer notifying a higher protocol layer that resumption of the RRC connection failed.

In some embodiments, the method 500 may include, while the timer is running, determining that decryption or integrity checking has failed for a packet and, responsive to determining that decryption or integrity checking has failed for the packet, discarding stored information regarding the RRC connection, and notifying a higher protocol layer that resumption of the RRC connection failed.

The method 500 may include receiving a message indicating that resumption of the RRC connected state is rejected, where the message indicating that resumption of the RRC connected state is not encrypted or integrity protected. The method 500 may also include, responsive to receiving the message, discarding stored information regarding the RRC connection.

According to some embodiments, the following steps are performed by the UE wanting to resume the connection. The steps are described below from the perspective of the RRC layer. The order of the steps could vary from what is described below. The UE generates new security keys, e.g., $K_{gNB}$, Kupint, KRRCenc, $K_{upenc}$, $K_{RRCint}$ used for encryption and integrity protection of signaling and/or data. That is done using security parameters received when the UE is suspended to RRC_INACTIVE. The UE generates an RRCResumeRequest message or similar. The message includes a security token calculated by the UE (so the network can verify the UE). The security token is calculated using the $K_{RRCint}$ and the integrity protection algorithm. The input to the algorithm could be the UEs identifies, the target/source cell, etc. The message can also include the UE identity (ResumeID, I-RNTI or any UE identity enabling the network to identify a UE context in the network), cause values, etc. The UE sends the message to the network. The sending could be handled by a lower layer. The message is not encrypted. The UE starts timer T and the UE starts encryption and integrity protection. This could involve the RRC layer instructing lower layer (e.g., PDCP) to start encryption and integrity protection using the keys $K_{RRCint}$ and $K_{RRCenc}$, as described above for the transmission of the RRCResumeRequest. The configuration could also include configuration of the lower layer to discard packets (PDUs or Messages) for which integrity verification fails and also configure the lower layer to report the failures to RRC layer. The solution also covers an exception for that rule in the case of the reception of a response message on SRB0 which is not configured to apply ciphering and integrity protection.

According to some embodiments, the reception of the RRCResume message is an indication that the verification was successful. If the UE receives an RRCResume message from lower layers to the RRC layer, it means that the packet was verified from a lower layer since otherwise it would not have been delivered to the RRC layer. Upon reception of this message, the UE can stop timer T, enter an RRC connected state, send a RRCResumeComplete message and perform other actions upon reception of a verified RRCResume message.

The event of a successful verification was described above as the reception of a verified RRCResume message by the RRC layer from the lower layer (e.g., PDCP). It is also considered a successful event upon the reception of any RRC message that is expected as a response of an RRCResumeRequest message and that can be transmitted on SRB1 (i.e., at least integrity protected) such as an RRCReject, RRCRelease or RRCSuspend, where actions can be performed upon the reception of any of these messages in the case they are verified.

Upon transmitting an RRCResumeRequest, the UE may receive from the network, an RRCReject message on SRB0, i.e., not encrypted nor integrity protected. Hence, that is an exception of the verification rule that is configured to be performed by lower layers. Or, alternatively, the lower layers may indicate an RRCReject message reception, it being a sign that verification was not needed (as that was sent on SRB0).

In some embodiments, an RRCReject message could be transmitted in response to an RRCResumeRequest, although it could either be sent on SRB1 (encrypted and integrity protected) or SRB0 (neither encrypted nor integrity protected). In that case, the following can be supported: the UE receives the RRCReject from lower layers to indicate that the message was transmitted in SRB1 and that it was verified or that the RRCReject was sent on SRB0. In addition, the UE may receive an indication from lower layers that this was transmitted on SRB1. Also, the UE may receive an indication from lower layers that this was transmitted on SRB0. If timer T expires (times out) prior to the UE receiving any valid response message, the UE could discard the connection, discard the stored UE context, and inform an upper layer of the failure to resume the RRC connection. If the RRC layer, while timer T is running, receives an indication from a lower layer that a packet has failed RRC integrity protection verification, the UE can discard the connection, discard the stored UE context, and inform an upper layer of the failure to resume the RRC connection. The UE may also create a failure report to be later provided to the network containing information about the failure, such as the verification result and location information such as cell identifiers, etc.

If the UE has entered an RRC connected state and later receives an indication from the lower layer that a packet related to a signaling radio bearer (RRC) has failure integrity protection, the UE will initiate an RRC Re-establishment procedure. Note that in previous approaches, the UE always does this when integrity/encryption has started. In some embodiments, this is activated only when the UE has entered RRC Connected and timer T has been stopped.

The functions described above are performed in the UE. The network may, however, perform corresponding functions in support, including: receiving the RRCResumeRequest; locating the UE context related to the Resume ID or I-RNTI provided by the UE in the RRCResumeRequest message; calculating/deriving the UE security Keys; verifying the security token of the RRCResumeRequest message; starting encryption/integrity protection; and/or sending the RRCResume message to the UE (or any other message that could be sent in response to an RRCResumeRequest such as RRCReject, RRCRelease or RRCSuspend). This message is encrypted and integrity protected. If the UE successfully verifies the message, the network will receive a RRCResumeComplete message from UE (in response to a RRCResume message). If the UE does not successfully verify the message, the network will remove the connection after a time corresponding to timer T.

Example Implementation

Figure 6:
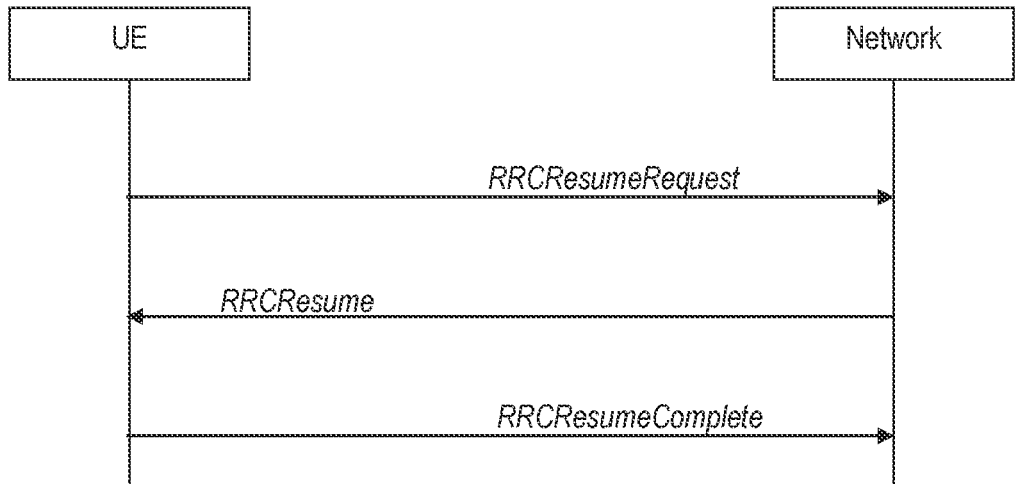
FIG. 6 is a signal flow for RRC connection resume, according to some embodiments.

A possible implementation in the standard is shown below, according to some embodiments. The case shown covers both the variant when the lower layer indicates integrity failure to the RRC layer or when the lower layer just discards the packets failing an integrity check. FIG. 6 illustrates a signal flow for an RRC connection resume that is successful.

—Begin proposed changes to the standard, changes in bold—

5.3.13 RRC connection resumption 5.3.13.1 General

The purpose of this procedure is to resume an RRC connection including resuming SRB(s) and DRB(s) or perform an RNA update.

Initiation

The UE initiates the procedure when upper layers request resume of an RRC connection while the UE is in RRC_INACTIVE.

Upon initiation of the procedure, the UE shall:
1> if the result of access control check specified in 5.3.z..x0, is that the cell is barred;
  2> inform upper layers about the failure to resume the RRC connection upon which the procedure ends;
1> apply the default physical channel configuration as specified in 9.2.4;
1> apply the default semi-persistent scheduling configuration as specified in 9.2.3;
1> apply the default MAC main configuration as specified in 9.2.2;
1> apply the CCCH configuration as specified in 9.1.1.2;
1> start timer T300;
1> initiate transmission of the RRCResumeRequest message in accordance with 5.3.13.2;

5.3.13.3 Actions related to transmission of RRCResumeRequest message

The UE shall set the contents of RRCResumeRequest message as follows:
1> set the resumeIdentity to the stored I-RNTI value provided in suspend;

1> set the resume Cause in accordance with the information received from upper layers or from AS layer;
1> set the resume Cause in accordance with the information received from upper layers or from AS layer;
1> update the $K_{gNB}$ key based on the current $K_{gNB}$ or the NH, using the stored nextHopChainingCount value, as specified in TS 33.501 [11];
1> derive the $K_{RRCenc}$ key, the $KRRC_{int}$, the $K_{UPint}$ key and the $K_{UPenc}$ key;
1> set the resumeMAC-I to the X least significant bits of the MAC-I calculated:
  2> over the ASN.1 encoded as per section 8 (i.e., a multiple of 8 bits) VarResumeMAC-Input;
  2> with the $K_{RRCint}$ key and the previously configured integrity protection algorithm; and
  2> with all input bits for COUNT, BEARER and DIRECTION set to binary ones;
1> restore the RRC configuration and security context from the stored UE AS context:
1> restore the PDCP state and re-establish PDCP entities for SRB1;
1> resume SRB1;
1> submit the RRCResumeRequest message to lower layers for transmission;
1> configure lower layers to resume integrity protection for all radio bearers except SRB0 using the previously configured algorithm and the $K_{RRCint}$ key and $K_{UPint}$ key immediately, i.e., integrity protection shall be applied to all subsequent messages received and sent by the UE;
1> configure lower layers to resume ciphering for all radio bearers except SRB0 and to apply the previously configured ciphering algorithm, the $K_{RRCenc}$ key and the $K_{UPenc}$ key, i.e. the ciphering configuration shall be applied to all subsequent messages received and sent by the UE;
If lower layers indicate an integrity check failure while T300 is running, perform actions specified in 5.3.13.9.
The UE shall continue cell re-selection related measurements as well as cell re-selection evaluation. If the conditions for cell re-selection are fulfilled, the UE shall perform cell re-selection as specified in 5.3.3.5.

5.3.13.4 Reception of the RRCResume by the UE

The UE shall:
1> stop timer T300;
1> restore the PDCP state and re-establish PDCP entities for SRB2 and all DRBs;
1> if drb-ContinueROHC is included:
  2> indicate to lower layers that stored UE AS context is used and that drb-ContinueROHC is configured;
  2> continue the header compression protocol context for the DRBs configured with the header compression protocol;
1> else:
  2> indicate to lower layers that stored UE AS context is used;
  2> reset the header compression protocol context for the DRBs configured with the header compression protocol;
1> discard the stored UE AS context and resumeIdentity;
1> if the RRCResume includes the masterCellGroup:
  2> perform the cell group configuration for the received masterCellGroup according to 5.3.5.5;
1> if the RRCResume includes the secondCellGroup:
  2> perform the cell group configuration for the received secondaryCellGroup according to 5.3.5.5;

1> if the RRCResume includes the radioBearerConfig is included:

2> perform the radio bearer configuration according to 5.3.5.6;

1> resume SRB2 and all DRBs;

1> if stored, discard the cell reselection priority information provided by the idleModeMobilityControlInfo or inherited from another RAT;

1> if the RRCResume message includes the measConfig:

2> perform the measurement configuration procedure as specified in 5.5.2;

1> resume measurements if suspended;

1> enter RRC_CONNECTED;

1> indicate to upper layers that the suspended RRC connection has been resumed;

1> stop the cell re-selection procedure;

1> consider the current cell to be the PCell;

1> set the content of the of RRCResumeComplete message as follows:

2> if the upper layer provide NAS PDU include and set the the dedicatedInfoNAS to include the information received from upper layers; 1> submit the RRCResumeComplete message to lower layers for transmission;

1> the procedure ends.

5.3.13.9 T300 expiry (during RRC resumption) or Integrity check failure from lower layers while T300 is running The UE shall:

1> if timer T300 expires or Integrity check failure from lower layers while T300 is running:

2> discard the stored UE AS context and resumeIdentity;

2> reset MAC, release the MAC configuration and re-establish RLC for all RBs that are established;

2> inform upper layers about the failure to resume the RRC connection, upon which the procedure ends;

—End proposed changes to the standard

Figure 7:
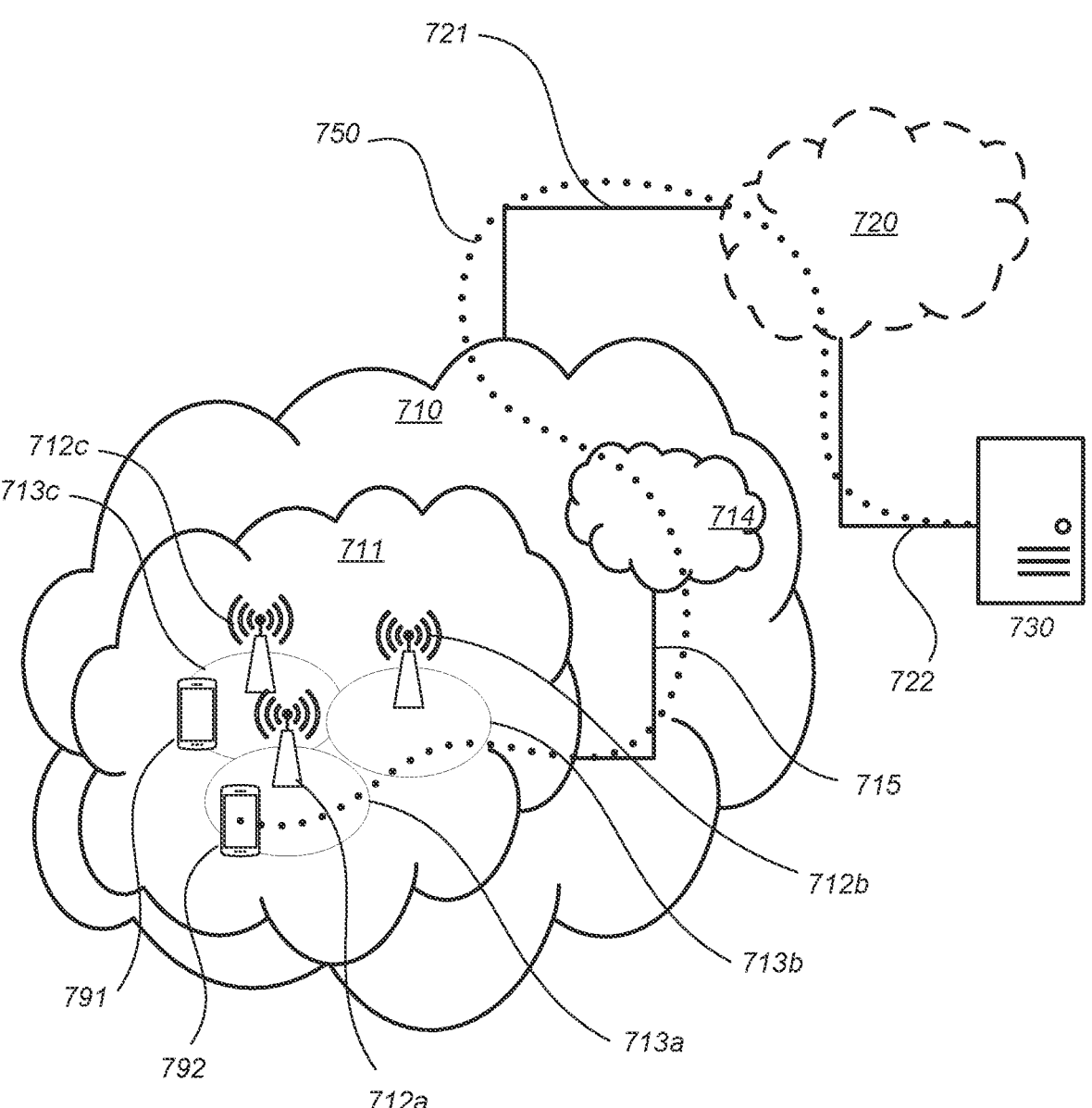
FIG. 7 illustrates an example communication system, according to some embodiments.

FIG. 7, in accordance with various embodiments, shows a communication system that includes a telecommunication network 710, such as a 3GPP-type cellular network, which comprises an access network 711, such as an gNB-RAN, and a core network 714 (e.g., 5GC). The access network 711 comprises a plurality of base stations 712a, 712b, 712c, such as gNBs or other types of wireless access points, each defining a corresponding coverage area 713a, 713b, 713c. Each base station 712a, 712b, 712c is connectable to the core network 714 over a wired or wireless connection 715. A first user equipment (UE) 791 located in coverage area 713c is configured to wirelessly connect to, or be paged by, the corresponding base station 712c. A second UE 792 in coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712.

The telecommunication network 710 is itself connected to a host computer 730, which may be embodied in the hardware and/or software of a standalone server, a cloud-implemented server, a distributed server or as processing resources in a server farm. The host computer 730 may be under the ownership or control of a service provider, or may be operated by the service provider or on behalf of the service provider. The connections 721, 722 between the telecommunication network 710 and the host computer 730 may extend directly from the core network 714 to the host computer 730 or may go via an optional intermediate network 720. The intermediate network 720 may be one of, or a combination of more than one of, a public, private or hosted network; the intermediate network 720, if any, may be a backbone network or the Internet; in particular, the intermediate network 720 may comprise two or more sub-networks (not shown).

The communication system of FIG. 7 as a whole enables connectivity between one of the connected UEs 791, 792 and the host computer 730. The connectivity may be described as an over-the-top (OTT) connection 750. The host computer 730 and the connected UEs 791, 792 are configured to communicate data and/or signaling via the OTT connection 750, using the access network 711, the core network 714, any intermediate network 720 and possible further infrastructure (not shown) as intermediaries. The OTT connection 750 may be transparent in the sense that the participating communication devices through which the OTT connection 750 passes are unaware of routing of uplink and downlink communications. For example, a base station 712 may not or need not be informed about the past routing of an incoming downlink communication with data originating from a host computer 730 to be forwarded (e.g., handed over) to a connected UE 791. Similarly, the base station 712 need not be aware of the future routing of an outgoing uplink communication originating from the UE 791 towards the host computer 730.

Example implementations, in accordance with an embodiment, of the UE, base station and host computer discussed in the preceding paragraphs will now be described with reference to FIG. 8. In a communication system 800, a host computer 810 comprises hardware 815 including a communication interface 816 configured to set up and maintain a wired or wireless connection with an interface of a different communication device of the communication system 800. The host computer 810 further comprises processing circuitry 818, which may have storage and/or processing capabilities. In particular, the processing circuitry 818 may comprise one or more programmable processors, application-specific integrated circuits, field programmable gate arrays or combinations of these (not shown) adapted to execute instructions. The host computer 810 further comprises software 811, which is stored in or accessible by the host computer 810 and executable by the processing circuitry 818. The software 811 includes a host application 812. The host application 812 may be operable to provide a service to a remote user, such as a UE 830 connecting via an OTT connection 850 terminating at the UE 830 and the host computer 810. In providing the service to the remote user, the host application 812 may provide user data which is transmitted using the OTT connection 850.

The communication system 800 further includes a base station 820 provided in a telecommunication system and comprising hardware 825 enabling it to communicate with the host computer 810 and with the UE 830. The hardware 825 may include a communication interface 826 for setting up and maintaining a wired or wireless connection with an interface of a different communication device of the communication system 800, as well as a radio interface 827 for setting up and maintaining at least wireless connection 870 with the UE 830 located in a coverage area (not shown in FIG. 8) served by the base station 820. The communication interface 826 may be configured to facilitate a connection 860 to the host computer 810. The connection 860 may be direct or it may pass through a core network (not shown in FIG. 8) of the telecommunication system and/or through one or more intermediate networks outside the telecommunication system. In the embodiment shown, the hardware 825 of the base station 820 further includes processing circuitry 828, which may comprise one or more programmable processors, application-specific integrated circuits, field programmable gate arrays or combinations of these (not shown) adapted to execute instructions. The base station 820 further has software 821 stored internally or accessible via an external connection.

The communication system 800 further includes the UE 830 already referred to. Its hardware 835 may include a radio interface 837 configured to set up and maintain a wireless connection 870 with a base station serving a coverage area in which the UE 830 is currently located. The hardware 835 of the UE 830 further includes processing circuitry 838, which may comprise one or more programmable processors, application-specific integrated circuits, field programmable gate arrays or combinations of these (not shown) adapted to execute instructions. The UE 830 further comprises software 831, which is stored in or accessible by the UE 830 and executable by the processing circuitry 838. The software 831 includes a client application 832. The client application 832 may be operable to provide a service to a human or non-human user via the UE 830, with the support of the host computer 810. In the host computer 810, an executing host application 812 may communicate with the executing client application 832 via the OTT connection 850 terminating at the UE 830 and the host computer 810. In providing the service to the user, the client application 832 may receive request data from the host application 812 and provide user data in response to the request data. The OTT connection 850 may transfer both the request data and the user data. The client application 832 may interact with the user to generate the user data that it provides.

Figure 8:
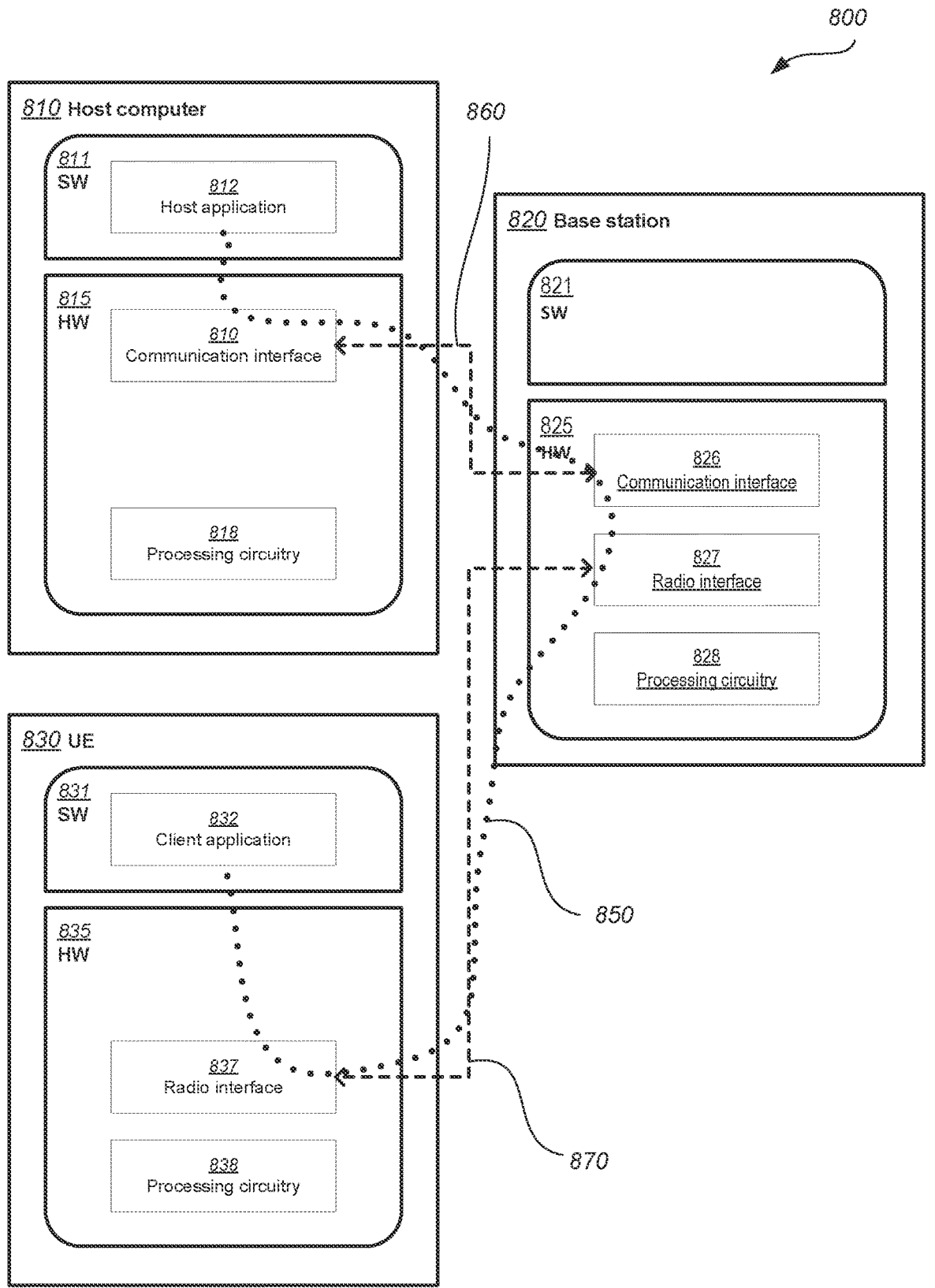
FIG. 8 is a generalized block diagram of a host computer communicating via a base station with a user equipment over a partially wireless connection, according to some embodiments.

It is noted that the host computer 810, base station 820 and UE 830 illustrated in FIG. 8 may be identical to the host computer 730, one of the base stations 712*a*, 712*b*, 712*c* and one of the UEs 791, 792 of FIG. 7, respectively. This is to say, the inner workings of these entities may be as shown in FIG. 8 and independently, the surrounding network topology may be that of FIG. 7.

In FIG. 8, the OTT connection 850 has been drawn abstractly to illustrate the communication between the host computer 810 and the use equipment 830 via the base station 820, without explicit reference to any intermediary devices and the precise routing of messages via these devices. Network infrastructure may determine the routing, which it may be configured to hide from the UE 830 or from the service provider operating the host computer 810, or both. While the OTT connection 850 is active, the network infrastructure may further make decisions by which it dynamically changes the routing (e.g., on the basis of load balancing consideration or reconfiguration of the network).

The wireless connection 870 between the UE 830 and the base station 820 is in accordance with the teachings of the embodiments described throughout this disclosure. One or more of the various embodiments improve the performance of OTT services provided to the UE 830 using the OTT connection 850, in which the wireless connection 870 forms the last segment. More precisely, the teachings of these embodiments may help the network to encrypt the RRCResume/RRCConnectionResume (or any other message transmitted in response to an RRCConnectionRequest), which increases security and privacy while speeding up the RRC connection resumption, since no additional encrypted message is needed. These embodiments will result in improved performance, such as better and more consistent throughput, and/or reduced delays for users of the RAN, including during idle/connection transitions.

A measurement procedure may be provided for the purpose of monitoring data rate, latency and other factors on which the one or more embodiments improve. There may further be an optional network functionality for reconfiguring the OTT connection 850 between the host computer 810 and UE 830, in response to variations in the measurement results. The measurement procedure and/or the network functionality for reconfiguring the OTT connection 850 may be implemented in the software 811 of the host computer 810 or in the software 831 of the UE 830, or both. In embodiments, sensors (not shown) may be deployed in or in association with communication devices through which the OTT connection 850 passes; the sensors may participate in the measurement procedure by supplying values of the monitored quantities exemplified above, or supplying values of other physical quantities from which software 811, 831 may compute or estimate the monitored quantities. The reconfiguring of the OTT connection 850 may include message format, retransmission settings, preferred routing etc.; the reconfiguring need not affect the base station 820, and it may be unknown or imperceptible to the base station 820. Such procedures and functionalities may be known and practiced in the art. In certain embodiments, measurements may involve proprietary UE signaling facilitating the host computer's 810 measurements of throughput, propagation times, latency and the like. The measurements may be implemented in that the software 811, 831 causes messages to be transmitted, in particular empty or 'dummy' messages, using the OTT connection 850 while it monitors propagation times, errors etc.

Figures 9, 10:
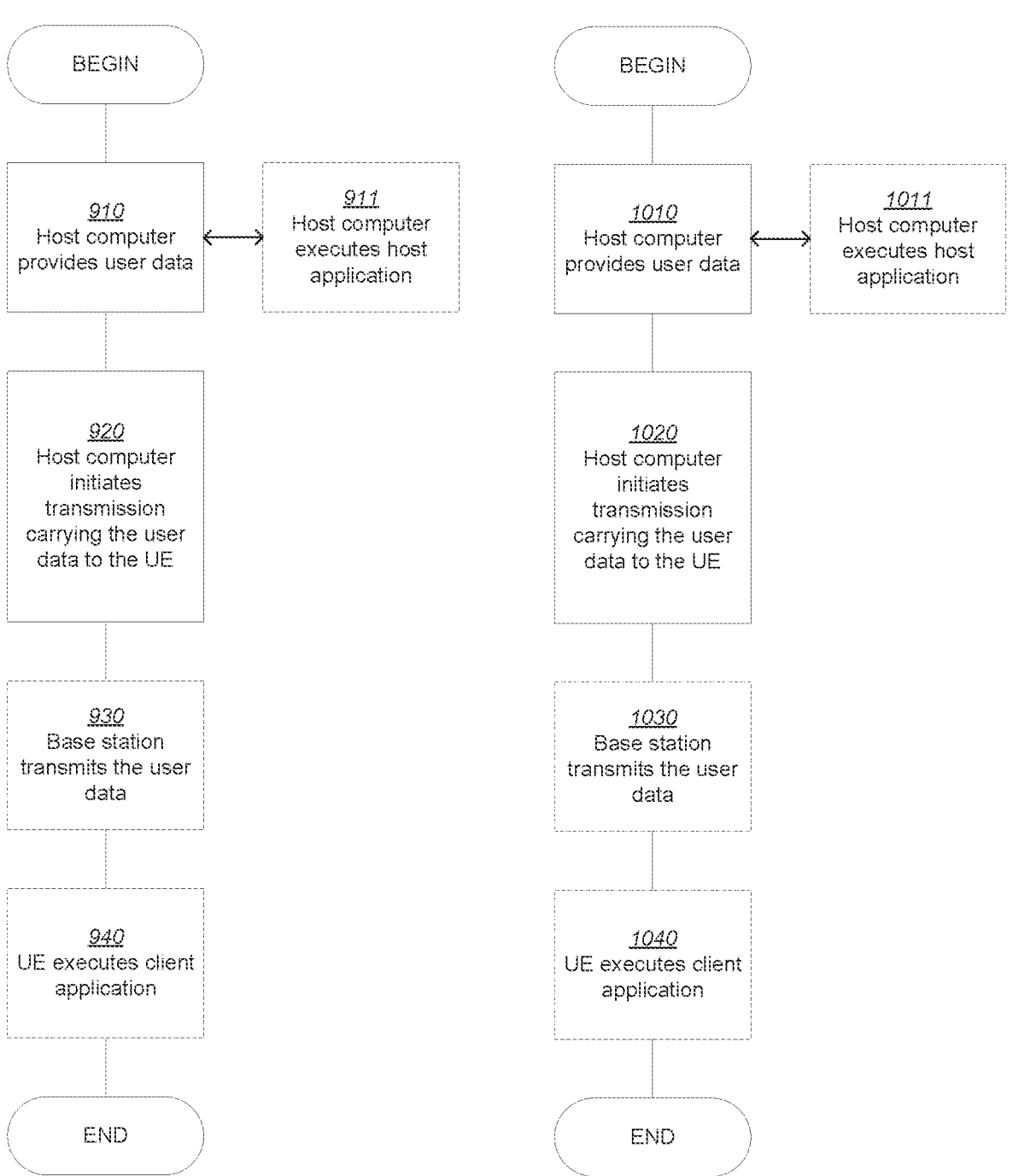
FIG. 9-12 are flowcharts illustrating methods implemented in a communication system including a host computer, a base station and a user equipment.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In a first step 910 of the method, the host computer provides user data. In an optional substep 911 of the first step 910, the host computer provides the user data by executing a host application. In a second step 920, the host computer initiates a transmission carrying the user data to the UE. In an optional third step 930, the base station transmits to the UE the user data which was carried in the transmission that the host computer initiated, in accordance with the teachings of the embodiments described throughout this disclosure. In an optional fourth step 940, the UE executes a client application associated with the host application executed by the host computer.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In a first step 1010 of the method, the host computer provides user data. In an optional substep (not shown), the host computer provides the user data by executing a host application. In a second step 1020, the host computer initiates a transmission carrying the user data to the UE. The transmission may pass via the base station, in accordance with the teachings of the embodiments described throughout this disclosure. In an optional third step 1030, the UE receives the user data carried in the transmission.

Figures 11, 12:
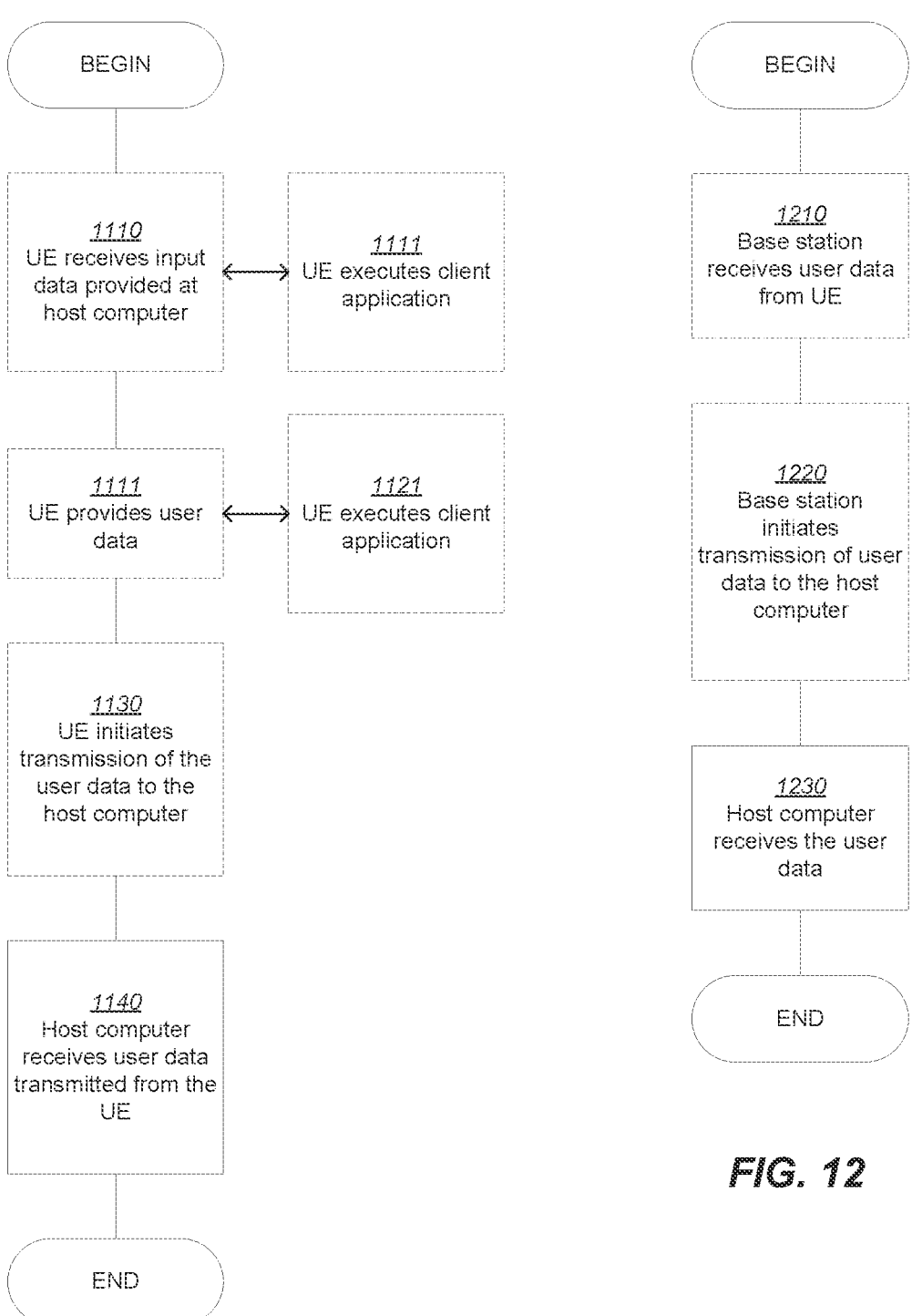

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In an optional first step 1110 of the method, the UE receives input data provided by the host computer. Additionally or alternatively, in an optional second step 1120, the UE provides user data. In an optional substep 1121 of the second step 1120, the UE provides the user data by executing a client application. In a further optional substep 1111 of the first step 2010, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1130, transmission of the user data to the host computer. In a fourth step 1140 of the method, the host computer receives the user data transmitted from the UE, in accordance with the teachings of the embodiments described throughout this disclosure.

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In an optional first step 1210 of the method, in accordance with the teachings of the embodiments described throughout this disclosure, the base station receives user data from the UE. In an optional second step 1220, the base station initiates transmission of the received user data to the host computer. In a third step 1230, the host computer receives the user data carried in the transmission initiated by the base station.

According to some embodiments, a method implemented in a communication system including a host computer, a base station and a UE includes, at the host computer, providing user data and initiating a transmission carrying the user data to the UE via a cellular network comprising the base station. The base station performs a method that includes receiving, from the UE operating in an RRC inactive state, a message requesting resumption of an RRC connected state for the UE, and in response to said message, encrypting and integrity protecting one or more response messages. The method also includes sending the encrypted and integrity protected one or more response messages to the UE. The method at the base station may include transmitting the user data. The user data may be provided at the host computer by executing a host application, and the method may further include, at the UE, executing a client application associated with the host application.

According to some embodiments, a method implemented in a communication system including a host computer, a base station, and a UE includes, at the host computer, receiving, from the base station, user data originating from a transmission which the base station has received from the UE. The base station performs a method that includes receiving, from the UE operating in an RRC inactive state, a message requesting resumption of an RRC connected state for the UE, and in response to said message, encrypting and integrity protecting one or more response messages. The method includes sending the encrypted and integrity protected one or more response messages to the UE. The method at the base station may include receiving the user data from the UE. The method at the base station may include initiate a transmission of the received user data to the host computer.

According to some embodiments, a communication system may include a host computer that includes processing circuitry configured to provide user data and a communication interface configured to forward the user data to a cellular network for transmission to a UE, where the cellular network comprises a base station having communication circuitry and processing circuitry. The base station's processing circuitry may receive, from the UE operating in an RRC inactive state, a message requesting resumption of an RRC connected state for the UE, and in response to said message, encrypt and integrity protect one or more response messages. The base station's processing circuitry is also configured to send the encrypted and integrity protected one or more response messages to the UE. The communication system may include the base station and/or the UE, where the UE is configured to communicate with the base station. The processing circuitry of the host computer may be configured to execute a host application, thereby providing the user data, and the UE may include processing circuitry configured to execute a client application associated with the host application.

According to some embodiments, a communication system including a host computer comprising a communication interface configured to receive user data originating from a transmission from a UE to a base station and comprising a radio interface and processing circuitry. The base station's processing circuitry is configured to receive, from the UE operating in an RRC inactive state, a message requesting resumption of an RRC connected state for the UE. The processing circuitry is configured to, in response to said message, encrypt and integrity protect one or more response messages and send the encrypted and integrity protected one or more response messages to the UE. The communication system may include the base station and/or the UE, where the UE is configured to communicate with the base station. The host computer may include processing circuitry configured to execute a host application, and the UE may be configured to execute a client application associated with the host application, thereby providing the user data to be received by the host computer.

According to some embodiments, a method implemented in a communication system including a host computer, a base station and a UE includes, at the host computer, providing user data and initiating a transmission carrying the user data to the UE via a cellular network comprising the base station. The method at the UE includes sending, while in an RRC inactive state, a message requesting resumption of an RRC connected state. The method also includes, upon sending said message, starting a timer according to a predetermined value and while said timer is running, attempting decryption and integrity check handling for packets subsequently received from the wireless network. The method at the UE may include receiving the user data from the base station.

According to some embodiments, a communication system including a host computer includes a communication interface configured to receive user data originating from a transmission from a UE to a base station. The UE's processing circuitry is configured to send, while in an RRC inactive state, a message requesting resumption of an RRC connected state. The UE's processing circuitry is also configured to, upon sending said message, start a timer according to a predetermined value and while said timer is running, attempt decryption and integrity check handling for packets subsequently received from the wireless network. The communication system may include the UE and/or the base station, where the base station includes a radio interface configured to communicate with the UE and a communication interface configured to forward to the host computer the user data carried by a transmission from the UE to the base station. The processing circuitry of the host computer may be configured to execute a host application, and the UE's processing circuitry may be configured to execute a client application associated with the host application, thereby providing the user data. The processing circuitry of the host computer may be configured to execute a host application, thereby providing request data, and the UE's processing circuitry may be configured to execute a client application associated with the host application, thereby providing the user data in response to the request data.

According to some embodiments, a method implemented in a UE includes sending, while in an RRC inactive state, a message requesting resumption of an RRC connected state and upon sending said message, starting a timer according to a predetermined value. The method includes, while said timer is running, attempting decryption and integrity check handling for packets subsequently received from the wireless network. The method may include providing user data and forwarding the user data to a host computer via the transmission to the base station.

According to some embodiments, a method implemented in a communication system including a host computer, a base station and a UE includes, at the host computer, receiving user data transmitted to the base station from the UE. The method at the UE includes sending, while in an RRC inactive state, a message requesting resumption of an RRC connected state and upon sending said message, starting a timer according to a predetermined value. The method also includes, while said timer is running, attempting decryption and integrity check handling for packets subsequently received from the wireless network. The method at the UE may include providing the user data to the base station and/or executing a client application, thereby providing the user data to be transmitted, The method at the host computer may include executing a host application associated with the client application. The method at the UE may include executing a client application and receiving input data to the client application, the input data being provided at the host computer by executing a host application associated with the client application, where the user data to be transmitted is provided by the client application in response to the input data.

According to some embodiments, a communication system including a host computer comprises a communication interface configured to receive user data originating from a transmission from a UE to a base station. The UE's processing circuitry is configured to send, while in an RRC inactive state, a message requesting resumption of an RRC connected state. The UE's processing circuitry is also configured to, upon sending said message, start a timer according to a predetermined value and, while said timer is running, attempt decryption and integrity check handling for packets subsequently received from the wireless network. The communication system may include the UE. The communication system may include the base station, where the base station comprises a radio interface configured to communicate with the UE and a communication interface configured to forward to the host computer the user data carried by a transmission from the UE to the base station. The processing circuitry of the host computer may be configured to execute a host application and the UE's processing circuitry may be configured to execute a client application associated with the host application, thereby providing the user data. The processing circuitry of the host computer may be configured to execute a host application, thereby providing request data, and the UE's processing circuitry may be configured to execute a client application associated with the host application, thereby providing the user data in response to the request data.

As discussed in detail above, the techniques described herein, e.g., as illustrated in the process flow diagrams of FIGS. 3 and 5, may be implemented, in whole or in part, using computer program instructions executed by one or more processors. It will be appreciated that a functional implementation of these techniques may be represented in terms of functional modules, where each functional module corresponds to a functional unit of software executing in an appropriate processor or to a functional digital hardware circuit, or some combination of both.

Figure 13:
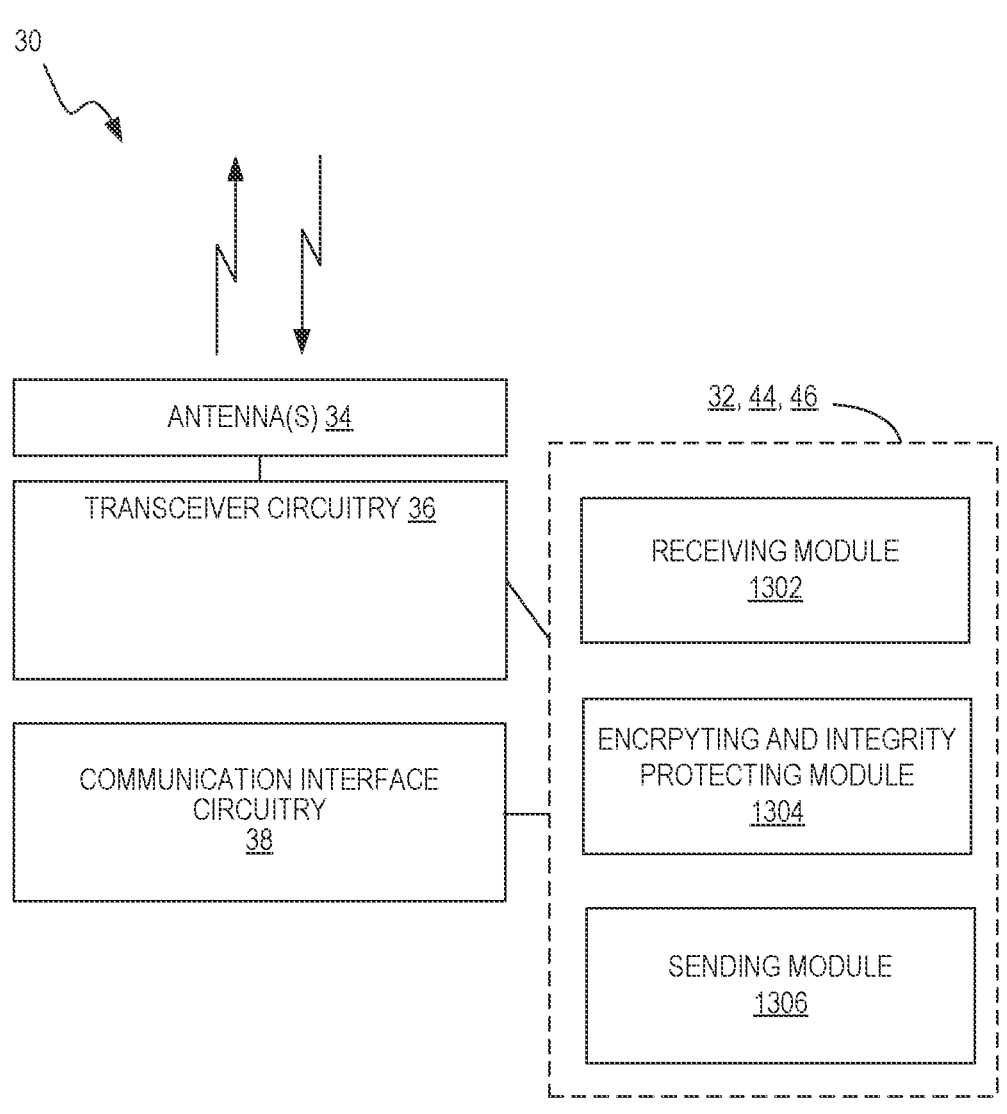
FIG. 13 is a block diagram illustrating a functional representation of an example of one or more network nodes, according to some embodiments.

FIG. 13 illustrates an example functional module or circuit architecture as may be implemented in one or more network nodes 30. The implementation includes a receiving module 1302 for receiving, from a wireless device operating in an RRC inactive state, a message requesting resumption of an RRC connected state for the wireless device. The implementation includes an encrypting and integrity module 1304 for, in response to said message, encrypting and integrity protecting one or more response messages and sending module 1306 for sending the encrypted and integrity protected one or more response messages to the wireless device.

Figure 14:
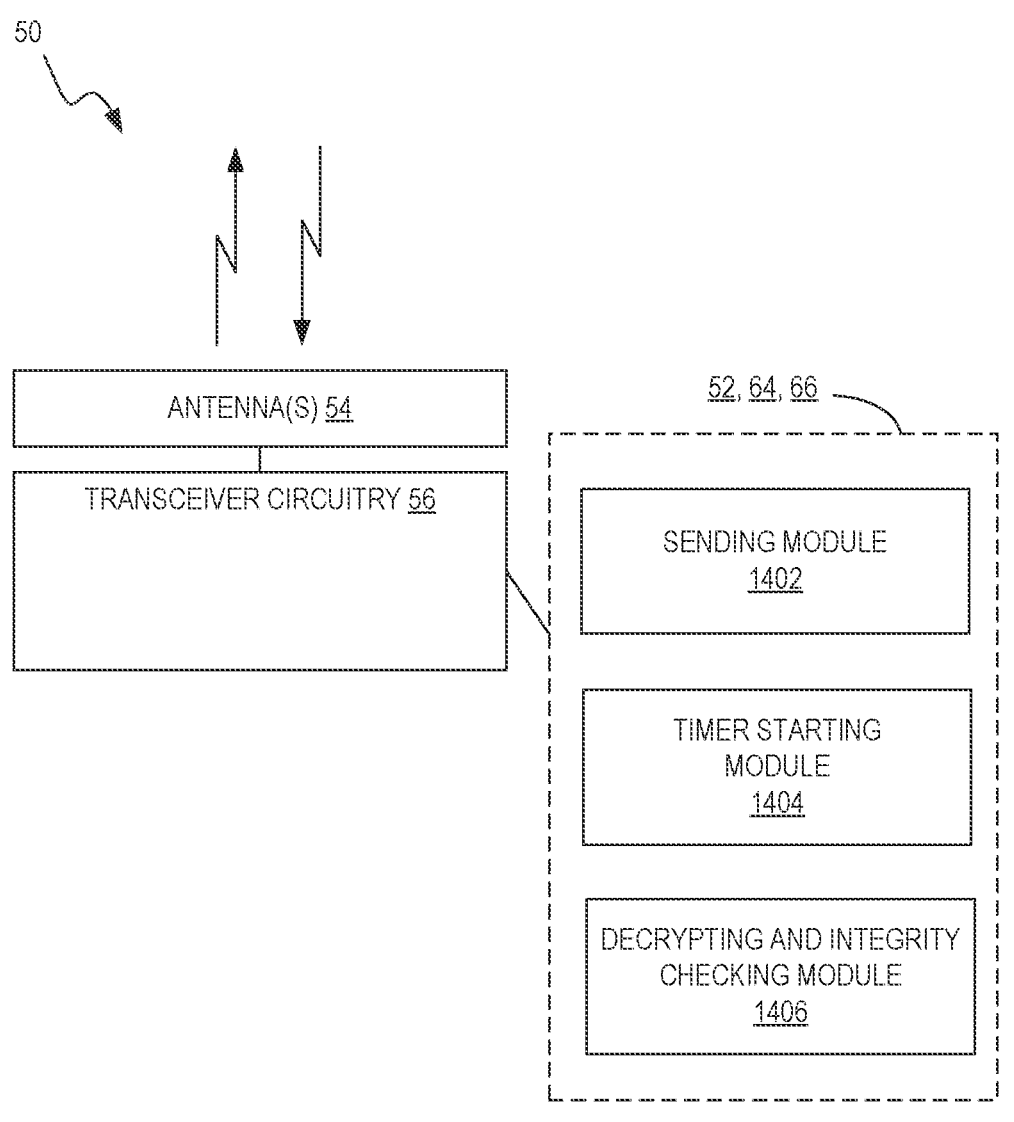
FIG. 14 is a block diagram illustrating a functional representation of an example wireless device, according to some embodiments.

FIG. 14 illustrates an example functional module or circuit architecture as may be implemented in a wireless device 50. The implementation includes a sending module 1402 for sending, while in an RRC inactive state, a message requesting resumption of an RRC connected state. The implementation also includes a timer starting module 1404 for, upon sending the message, starting a timer according to a predetermined value. The implementation further includes a decrypting and integrity module 1406 for, while said timer is running, attempting decryption and integrity check handling for packets subsequently received from the wireless network.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method, in a wireless device operating in a wireless network, for providing security of messages, the method comprising:

generating one or more security keys for encryption of signaling and/or data, using one or more security parameters received by the wireless device while in a Radio Resource Control (RRC) inactive state;

sending, while in the RRC inactive state, a message requesting resumption of an RRC connected state;

starting a timer according to a predetermined value, upon sending the message; and while said timer is running, attempting decryption for all packets received from the wireless network, using the generated one or more security keys.

2. The method of claim 1, wherein attempting decryption comprises an RRC layer requesting decryption from a Packet Data Convergence Protocol (PDCP) layer.

3. The method of claim 1, wherein the method further comprises:

while said timer is running, determining that decryption has failed for a packet; and discarding the packet for which decryption has failed.

4. The method of claim 3, wherein said determining is performed in a first protocol layer and the method further comprises the first protocol layer notifying a higher protocol layer of the failure.

5. The method of claim 1, wherein the method further comprises:

while said timer is running, successfully decrypting a message indicating a resumption of the RRC connected state; and responsive to said successfully decrypting a message, stopping the timer and entering the RRC connected state.

6. The method of claim 5, wherein the method further comprises, subsequently to entering the RRC connected state:

determining that a packet received while in the RRC connected state has failed integrity checking; and responsive to the failed integrity checking, initiating a re-establishment of the RRC connected state.

7. The method of claim 1, wherein the method further comprises:

determining that the timer has expired and, in response to the timer expiring, discarding stored information regarding the RRC connection.

8. The method of claim 7, wherein said determining that the timer has expired and said discarding the stored information is performed in a first protocol layer, and the method further comprises the first protocol layer notifying a higher protocol layer that resumption of the RRC connection failed.

9. The method of claim 1, wherein the method further comprises:

while said timer is running, determining that decryption has failed for a packet; and responsive to determining that decryption has failed for the packet, discarding stored information regarding the RRC connection and notifying a higher protocol layer that resumption of the RRC connection failed.

10. The method of claim 1, wherein the method further comprises:

receiving a message indicating that resumption of the RRC connected state is rejected, wherein the message indicates that resumption of the RRC connected state is not encrypted; and responsive to receiving said message, discarding stored information regarding the RRC connection.

11. A wireless device configured for operating in a wireless network and for providing security of messages, the wireless device comprising:

transceiver circuitry; and processing circuitry operatively associated with the transceiver circuitry and configured to:

generate one or more security keys for encryption of signaling and/or data, using one or more security parameters received by the wireless device while in a Radio Resource Control (RRC) inactive state;

send, while in the RRC inactive state, a message requesting resumption of an RRC connected state;

start a timer according to a predetermined value, upon sending the message; and while said timer is running, attempt decryption for all packets received from the wireless network, using the one or more generated security keys.

12. The wireless device of claim 11, wherein the processing circuitry is configured to attempt decryption by having a RRC layer request decryption from a Packet Data Convergence Protocol (PDCP) layer.

13. The wireless device of claim 11, wherein the processing circuitry is configured to:

while said timer is running, determine that decryption has failed for a packet; and discard the packet for which decryption or integrity checking has failed.

14. The wireless device of claim 11, wherein the processing circuitry is configured to:

while said timer is running, successfully decrypt a message indicating a resumption of the RRC connected state; and responsive to said successfully decrypting a message, stop the timer and entering the RRC connected state.

15. The wireless device of claim 14, wherein the processing circuitry is configured to, subsequently to entering the RRC connected state:

determine that a packet received while in the RRC connected state has failed integrity checking; and responsive to the failed integrity checking, initiate a re-establishment of the RRC connected state.

16. The wireless device of claim 11, wherein the processing circuitry is configured to:

determine that the timer has expired and, in response to the timer expiring, discard stored information regarding the RRC connection.

17. The wireless device of claim 16, wherein the processing circuitry is configured to determine that the timer has expired and discard the stored information in a first protocol layer, the first protocol layer notifying a higher protocol layer that resumption of the RRC connection failed.

18. The wireless device of claim 11, wherein the processing circuitry is configured to:

while said timer is running, determine that decryption has failed for a packet; and responsive to determining that decryption has failed for the packet, discard stored information regarding the RRC connection and notifying a higher protocol layer that resumption of the RRC connection failed.

19. The wireless device of claim 11, wherein the processing circuitry is configured to:

receive a message indicating that resumption of the RRC connected state is rejected, wherein the message indicates that resumption of the RRC connected state is not encrypted; and responsive to receiving said message, discard stored information regarding the RRC connection.

* * * * *